K. W. BARTLETT.
APPARATUS FOR TREATING LIQUIDS.
APPLICATION FILED JUNE 13, 1910.

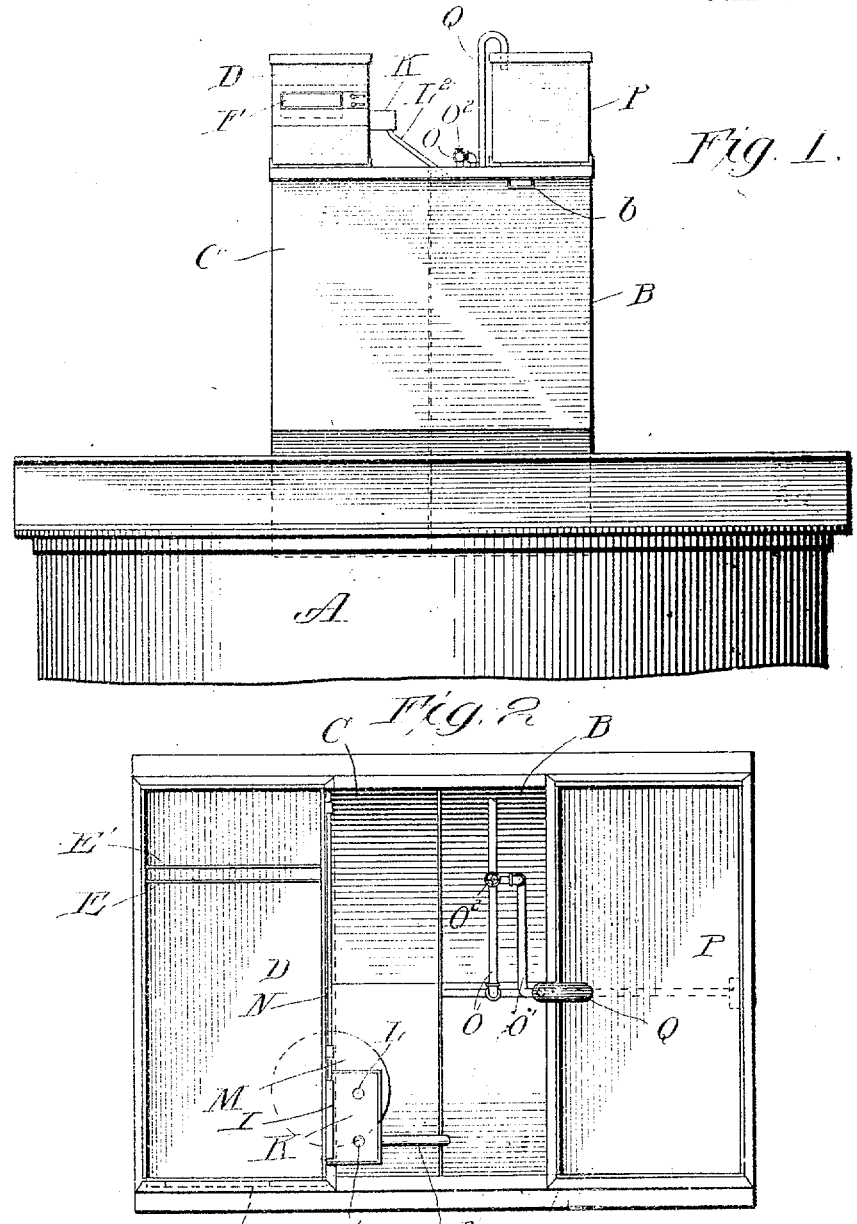

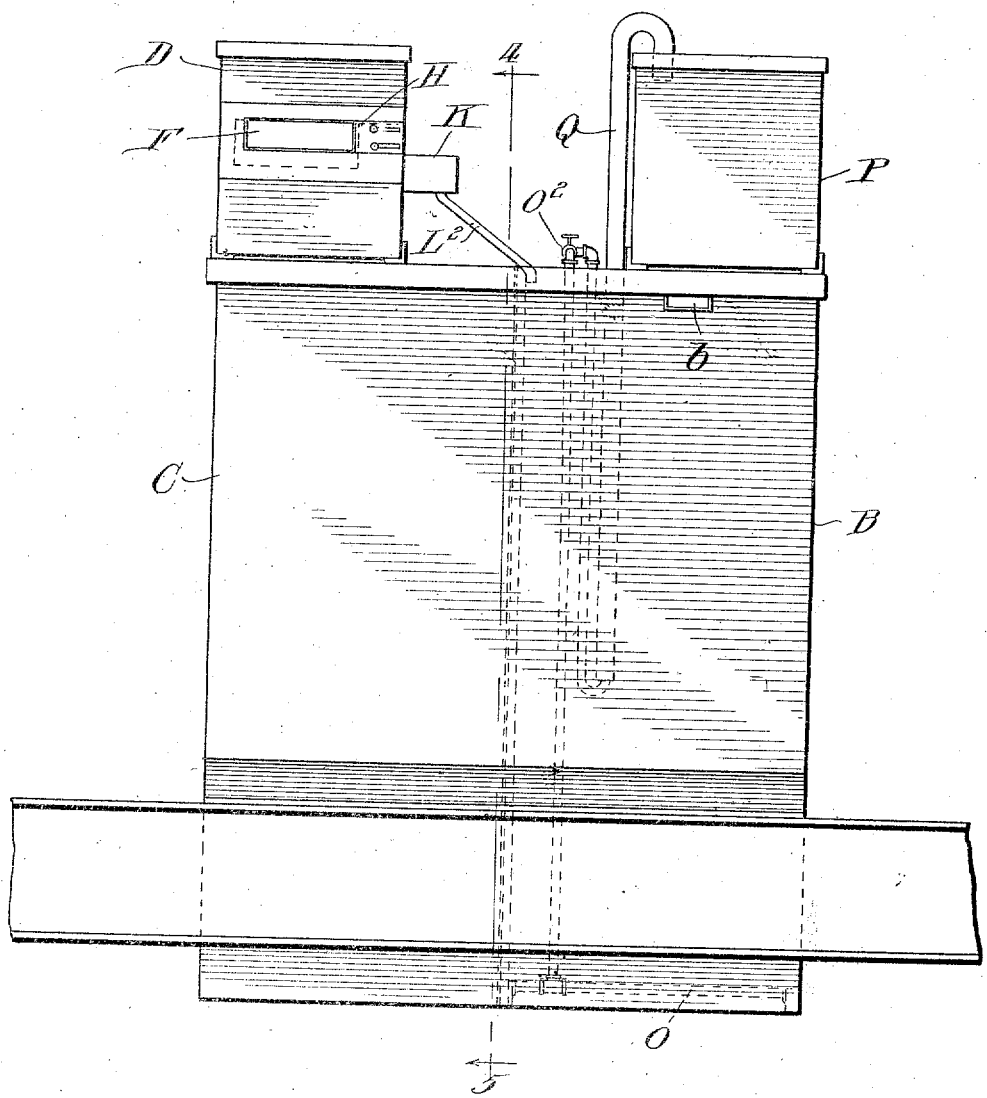

1,017,728.

Patented Feb. 20, 1912.
3 SHEETS—SHEET 3.

Witnesses:
Eugene H. Garultt
Wm. H. Henderreich

Inventor:
Kent W. Bartlett

UNITED STATES PATENT OFFICE.

KENT W. BARTLETT, OF CHICAGO, ILLINOIS, ASSIGNOR TO NORTHERN WATER SOFTENER COMPANY, A CORPORATION OF MAINE.

APPARATUS FOR TREATING LIQUIDS.

1,017,728. Specification of Letters Patent. Patented Feb. 20, 1912.

Application filed June 13, 1910. Serial No. 566,514.

*To all whom it may concern:*

Be it known that I, KENT W. BARTLETT, a citizen of the United States, residing at Chicago, county of Cook, and State of Illinois, have invented a new and useful Improvement in Apparatus for Treating Liquids, of which the following is a specification.

My invention relates particularly to an apparatus for treating water so as to soften the same and especially to an apparatus in which lime held in suspension in water is the reagent employed.

The demand for softened water from a water softening apparatus is almost invariably irregular and, as it is customary to maintain a substantially constant supply of softened water, raw water will enter the apparatus at continually varying rates. Since it is necessary to maintain a definite proportion between the amount of raw water supplied and the chemical reagent, the irregularity in the demand for softened water and consequently the irregularity in the flow of raw water to be treated, necessitates that the rate at which the reagent is introduced must also be continually varied in order that the correct proportion between raw water and the reagent may be maintained.

The object of my invention is to produce an apparatus of the character described above, wherein the correct proportion between the incoming raw water and the chemical reagent which is mixed therewith may be accurately maintained during all of the varying conditions of service.

Figure 4:
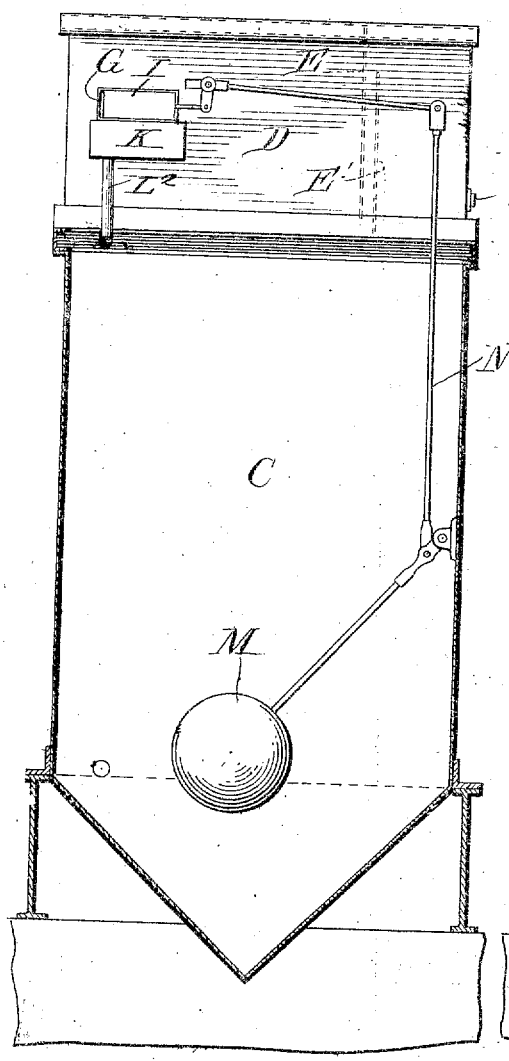
Figure 5:
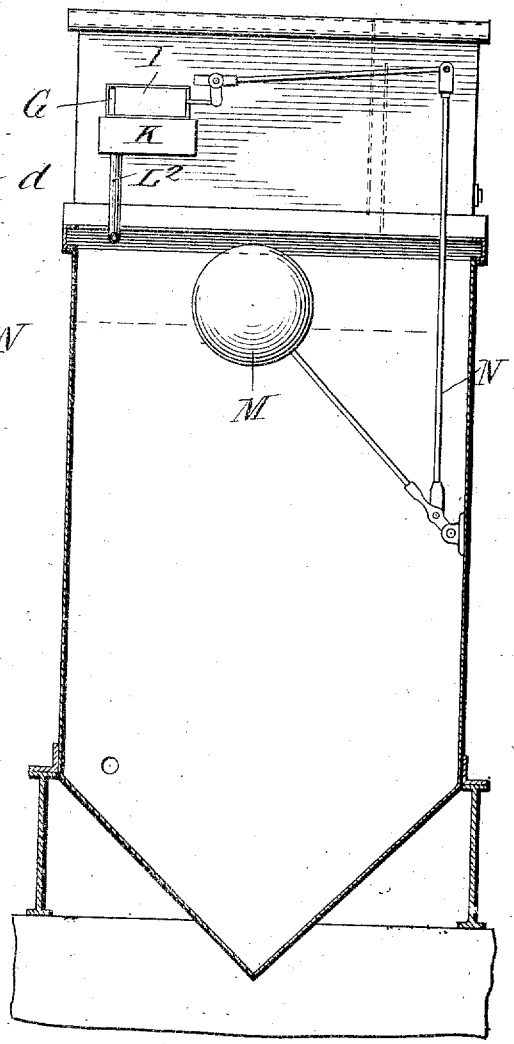

The various features of novelty whereby my invention is characterized will hereinafter be pointed out with particularity in the claims; but for a full understanding of my invention and of its object and advantages, reference may be had to the following detailed description taken in connection with the accompanying drawing, wherein:

Figure 1 shows a fragment of a mixing and storing reservoir having associated therewith an apparatus for supplying raw water and a chemical reagent in accordance with a preferred form of my invention; Fig. 2 is a plan view on an enlarged scale, the mixing and storage reservoir being omitted; Fig. 3 is an elevational view in Fig. 2; and Figs. 4 and 5 are sections taken on line 4—5 of Fig. 3, showing two different working conditions.

In accordance with my invention I provide a tank for holding the chemical reagent together with means for supplying water simultaneously to the tank and to the mixing and storing reservoir, there being an overflow from the chemical tank to the main reservoir; and control the water so supplied in such a manner that the proportion between the amount of water supplied to the chemical tank and that supplied directly to the main reservoir is progressively increased as the strength of the solution in the chemical tank diminishes, thus constantly maintaining the proper proportion between the amount of raw water and the amount of the chemical reagent actually contained in the solution supplied to the main reservoir. It will be seen that by effecting the regulation through control of the raw water, it may be accomplished much more conveniently and with greater accuracy than is the case where it is attempted to control the liquid flowing from the chemical tank, by varying the size of a valve opening or weir through which the solution passes; this being for the reason that the lime which is held in suspension in the chemical tank is constantly tending to settle and deposit about the discharge openings or in pipes and can only be prevented from so doing by providing an extremely efficient system of agitation, which it is almost impossible to do.

Referring to the drawings, A represents a combined storage reservoir for treated water and mixing reservoir for raw water and a chemical reagent. This reservoir may take any usual or preferred form and I shall therefore refrain from giving any detailed description thereof.

Mounted above the main reservoir are two tanks, B and C, the former being for the purpose of holding a chemical reagent and the other being a water-receiving tank for controlling purposes. These two tanks may conveniently be made in the form of a single member divided into two compartments by a suitable partition. The chemical tank is of such size that it will hold sufficient lime in suspension, together with such other chemicals as may be required, to afford a supply of the chemical reagent for a run of considerable length of the apparatus at full capacity, the contents of the tank being caused to overflow into the main reservoir through a gate or port $b$, as required. In the arrangement shown, the water tank C is exactly like the chemical tank both in size and shape although, as will hereinafter appear, it is not necessary that these tanks be of the same size since their capacities may bear any desired relation to each other.

D is a chamber mounted above the tank C and adapted to receive raw water from any suitable source. In the arrangement shown the water is adapted to enter through a port $d$ at one end and adjacent to this end are placed two baffle plates E and E' so that the force of the incoming water is broken before it can reach the main portion of the chamber and the water in the main portion of the chamber will at all times be comparatively quiet. The chamber D has two weirs F and G. These weirs are placed at the same level and are of the same height so that whenever water flows through one it will always flow through the other at a rate bearing a definite proportion to the rate of flow through the other. The weir F may be provided with an adjustable gate H for the purpose of varying the width of the weir. The weir G is also provided with an adjustable gate I. When water flows through the weir F it falls directly into the main reservoir. Beneath the weir G is a trough K which is provided with two openings through the bottom, L and L'. The opening L' registers with a pipe $L^2$ which discharges into the upper end of the chemical tank. The opening L is arranged directly above the water tank C so that water flowing therethrough falls into this tank. It will be seen that when water flows into the trough, a part of it passes to the chemical tank and the remainder passes into the tank C. In the arrangement shown, the tanks B and C are alike, as I have already stated, and therefore I make the openings L and L' of exactly the same size so that the amount of water which flows into either of the tanks B and C is equal to that which flows into the other.

Within the tank C is a float M connected by suitable lever mechanism N to the adjustable gate I. The arrangement is such that when the float is in its lowermost position the weir opening G is at its narrowest; the width of the weir opening G being increased as the float rises.

The operation is as follows: The chemical tank is filled until it is just ready to overflow, the tank C being left empty so that the float is in its lowermost position and the weir opening G is at its narrowest. Water is then allowed to run into the receiving chamber D and, when it reaches the level of the weirs F and G, begins to flow through these weirs into the main reservoir and into the trough K, respectively. The water in the trough divides, half going into the tank B and the other half into the tank C. The water entering the tank B displaces an equal amount of the liquid contained therein so that a volume of chemical solution equal to the volume of water entering this tank will overflow into the main reservoir. The parts are so proportioned that this amount of chemical is just enough to effect the desired softening of the volume of water which has passed into the main reservoir. It will be seen, however, that as the flow of water into the chemical tank and the flow of chemical mixture from the tank continues, the mixture in the chemical tank becomes progressively weaker so that the volume of the chemical solution or mixture which must be supplied to the main reservoir for a given volume of incoming raw water must be progressively increased in order to maintain the desired proportion between the chemical reagent and the raw water. This increase in the rate of flow of the chemical is automatically effected through the rise of water in the tank C, which causes the float to be gradually elevated and open the gate I wider and wider. Of course an increase in the weir opening G increases the proportion between the amount of water flowing into the chemical tank and the amount of water flowing directly into the main reservoir and consequently increases the proportion between the amount of liquid flowing from the chemical tank and the water flowing directly into the main reservoir. It will be seen that if the chemical tank has been charged so as to provide enough of the chemical reagent to last for a run of eighteen hours, at full capacity, then, after a consumption of softened water, corresponding to a run at full capacity for nine hours, the strength of the chemical solution will be only one half what it was before; but, by reason of the gradual widening of the weir opening G, the rate of flow through the weir F, has doubled so that twice as much solution as at the start will flow from the chemical tank for a given amount of raw water flowing into the main reservoir. In the same way the relative rates of flow of chemical solution and of raw water are automatically varied so as to maintain the proper ratio of raw water and chemical reagent at all times. After the chemical mixture in the supply tank has become sufficiently weakened, enough chemical is added to bring it up to its original strength, the tank C is emptied, and the operation then proceeds as before.

It will now be seen that the relative capacities of the tanks B and C, may be anything desired since the relative sizes of the outlets from the trough may be such as to effect a proper division between the water entering the trough and thus cause the float to control the gate I in such a way as to compensate for the diminishing strength of the chemical mixture in the tank.

The chemical mixture may be agitated in any suitable way as, for example, by forcing air into the tank through a perforated pipe O. If desired, a slaking tank P may be arranged above the chemical tank; the lime being slaked in this tank and impurities removed before it is allowed to enter the chemical tank. Q indicates a return pipe or elbow extending between the tanks B and P, there being a branch air pipe O' opening into the lower end of this pipe. $O^2$ is a three-way valve which will permit air to be shut off completely or to be supplied to either of the pipes O or O'.

It will now be seen that I have devised a simple and efficient apparatus for accurately treating water which is being consumed at any desired rate, since the accuracy of the treatment depends entirely upon the accuracy with which the original raw water is separated at the weirs F and G. By providing the weir F with an adjustable gate, the weir openings may be delicately adjusted. It will also be seen that because the proportion and control are effected on the plain clean water and not on gritty and corrosive chemicals which will clog and corrode orifices and pipes, thereby changing the amount of chemical that will pass through a given orifice or pipe, the accuracy of the proportion between the chemical and raw water, if originally correct, will be maintained.

While the chemical is, in the embodiment of the invention herein shown, supplied directly from the chemical tank to the mixing reservoir, I do not wish to be limited to the direct transfer of the chemical from the chemical tank to the mixing reservoir.

While I have illustrated and described with particularity only a single form of my invention I do not desire to be limited to the specific details so illustrated and described; but intend covering all constructions and arrangements which fall within the terms employed in the definitions of my invention constituting the appended claims.

What I claim is:

1. In combination, a mixing reservoir, a chemical tank having an overflow outlet for permitting chemical to flow into the mixing reservoir, means for supplying water to said reservoir, means for delivering water into said tank during the time water is being supplied to the reservoir, and devices for governing the latter means so as to increase the rate of delivery of water to said tank relative to the rate of flow of water into said reservoir with increases in the total volume of water introduced in the reservoir.

2. In combination, a mixing reservoir, a chemical tank having an overflow outlet for permitting chemical to flow into said reservoir, means for supplying water to said reservoir, means for causing water to flow into said tank during the time water is flowing into said reservoir, and devices for controlling the latter means so as progressively to increase the rate of flow of water into said tank relative to the rate of flow into said reservoir.

3. In combination, a mixing reservoir, a chemical tank having an overflow outlet for permitting chemical to flow into the mixing reservoir, means for supplying water to said reservoir, means for causing water to flow into said tank during the time water is flowing into said reservoir and at a rate proportioned to the rate of flow of water into the said reservoir, and controlling devices governed by the total amount of water received in the reservoir for progressively increasing the rate of flow of water into said tank relative to the rate of flow of water into said reservoir.

4. In combination, a mixing reservoir, a chemical tank having an overflow outlet for permitting chemical to flow into the mixing reservoir, means for supplying water to said reservoir, means for causing water to flow into said tank during the time water is flowing into said reservoir and at a rate proportioned to the rate of flow of water into the said reservoir, and a controlling device governed by the total amount of water received in the reservoir for controlling the latter means so as progressively to increase the rate of flow of water into said tank relative to the rate of flow of water into said reservoir.

5. In combination, a source of liquid supply, a liquid tank, a chemical tank, means including a valve for permitting liquid to flow from said source of liquid supply into each of the aforesaid tanks, and a device governed by the liquid level in the liquid tank for progressively operating said valve progressively to increase the quantity of liquid discharged into said chemical tank relative to the quantity of liquid discharged from the source of liquid supply.

6. In combination, a source of liquid supply, a liquid tank, a chemical tank discharging into the liquid, means for permitting liquid to flow from said source of liquid supply into each of the tanks, and a device governed by the liquid level in the liquid tank for progressively operating said means progressively to increase the quantity of liquid discharged into said chemical tank relative to the quantity of liquid discharged from the source of liquid supply.

7. In combination, a supply tank, a water tank, a chemical tank, means including a valve for permitting water to flow from the said supply tank to each of the other tanks, and a float connected to said valve and extending into said water tank, the arrangement being such that a rise in the water level in the water tank causes the valve to open more widely.

8. In combination, two tanks, a source of supply of water, a trough for receiving water from said source, a valve controlling the flow of water into said trough, there being independent outlets from said trough into said tanks, and means governed by the water level in one of said tanks for actuating said valve, so as to open the same more widely as the water level rises.

9. In combination, a mixing reservoir, a supply tank, a water tank, a chemical tank, said chemical tank having an overflow outlet to said mixing reservoir, means for permitting water to flow from said supply tank to said reservoir, means for permitting water to flow from said supply tank to each of the other tanks at a rate proportionate to the rate of flow into said reservoir, a controlling device for varying the rate of flow into said tanks, and means governed by the water level in said water tank for actuating said device.

10. In combination, a mixing reservoir, a source of water supply, a water tank, a chemical tank having an overflow outlet to said reservoir, means for permitting water to flow from said source to said reservoir, means for permitting water to flow from said source to each of said tanks during the time water flows from said source to said reservoir and at a rate proportionate to the rate of such flow, and a device governed by the water level in said water tank for controlling the latter means so as to increase the rate of flow to said tanks relative to the rate of flow to said reservoir as said level rises.

11. In combination, a mixing reservoir, a supply tank, a water tank, a chemical tank having an overflow outlet to said reservoir, there being a port in said supply tank for permitting water to flow to the said reservoir, a trough adjacent to said supply tank, there being a second port in said supply tank above said trough, said second port being at the same level and having the same height as the other port, a valve for controlling the effective width of said second port, there being independent outlets from said trough to the water tank and the chemical tank, and means controlled by the water level in the said water tank for actuating said valve to increase the effective width of said second port as the water level in said water tank rises.

12. Apparatus for treating liquid including a source of liquid supply from which liquid to be treated is furnished, a chemical tank from which liquid chemical may be passed into the liquid to be treated and from which chemical tank chemical may be discharged in progressively increasing quantity, and means for causing the passage of liquid into the chemical tank in progressively increasing quantity relative to the quantity of liquid passed from said source of liquid supply whereby the quantity of liquid chemical passing from the chemical tank increases progressively with respect to the quantity of liquid furnished for treatment from the source of liquid supply, to compensate for reduction in the strength of the liquid chemical.

13. Apparatus for treating liquid including a source of liquid supply from which liquid to be treated is furnished, a chemical tank from which liquid chemical may be passed into the liquid to be treated and from which chemical tank chemical may be discharged in progressively increasing quantity, and means, governed by the liquid, for causing the passage of liquid into the chemical tank in progressively increasing quantity relative to the quantity of liquid passed from said source of liquid supply whereby the quantity of liquid chemical passing from the chemical tank increases progressively with respect to the quantity of liquid furnished for treatment from the source of liquid supply, to compensate for reduction in the strength of the liquid chemical.

14. Apparatus for treating liquid including a source of liquid supply, a receptacle into which liquid to be treated is passed from said source of liquid supply, a chemical tank from which liquid chemical may be passed into said receptacle and from which chemical tank chemical may be discharged in progressively increasing quantity, and means for causing the passage of liquid into the chemical tank in progressively increasing quantity relative to the quantity of liquid passed from said source of liquid supply into said receptacle whereby the quantity of liquid chemical passing from the chemical tank increases progressively with respect to the quantity of liquid passing into said receptacle, to compensate for reduction in the strength of the liquid chemical.

15. Apparatus for treating liquid including a source of liquid supply, a receptacle into which liquid to be treated is passed from said source of liquid supply, a chemical tank from which liquid chemical may be passed into said receptacle and from which chemical tank chemical may be discharged in progressively increasing quantity, and means, governed by the liquid, for causing the passage of liquid into the chemical tank in progressively increasing quantity relative to the quantity of liquid passed from said source of liquid supply into said receptacle whereby the quantity of liquid chemical passing from the chemical tank increases progressively with respect to the quantity of liquid passing into said receptacle, to compensate for reduction in the strength of the liquid chemical.

16. In combination, a source of liquid supply, a liquid tank, a chemical tank discharging into the liquid, means for permitting liquid to flow from said source of liquid supply into each of the tanks, and a device governed by the liquid for progressively operating said means progressively to increase the quantity of liquid discharged into said chemical tank relative to the quantity of liquid discharged from the source of liquid supply.

In testimony whereof, I sign this specification in the presence of two witnesses.

KENT W. BARTLETT.

Witnesses:
HARRY S. GAITHER,
EUGENE H. GARNETT.

It is hereby certified that Letters Patent No. 1,017,728, granted February 20, 1912, upon the application of Kent W. Bartlett, of Chicago, Illinois, for an improvement in "Apparatus for Treating Liquids," were erroneously issued to "Northern Water Softener Company," as assignee of said invention, whereas said Letters Patent should have been issued to the inventor, *Kent W. Bartlett, as sole owner of said invention;* and that the said Letters Patent should be read with this correction therein that the same may conform to the record of the case in the Patent Office.

Signed and sealed this 19th day of March, A. D., 1912.

[SEAL.]

C. C. BILLINGS,
*Acting Commissioner of Patents.*